US009872232B2

(12) United States Patent
Shukla et al.

(10) Patent No.: US 9,872,232 B2
(45) Date of Patent: Jan. 16, 2018

(54) METHODS AND APPARATUS FOR NEIGHBORHOOD AREA NETWORK DETECTION

(71) Applicant: QUALCOMM Incorporated, San Diego, CA (US)

(72) Inventors: Ashish Kumar Shukla, Milpitas, CA (US); Alireza Raissinia, Monte Sereno, CA (US); Zhifeng Cai, Fremont, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 14/517,654

(22) Filed: Oct. 17, 2014

(65) Prior Publication Data

US 2015/0156709 A1    Jun. 4, 2015

Related U.S. Application Data

(60) Provisional application No. 61/910,813, filed on Dec. 2, 2013.

(51) Int. Cl.
H04W 48/16 (2009.01)
H04W 8/00 (2009.01)
H04L 29/08 (2006.01)

(52) U.S. Cl.
CPC ............ *H04W 48/16* (2013.01); *H04L 67/10* (2013.01); *H04W 8/005* (2013.01)

(58) Field of Classification Search
CPC ..... H04W 48/16; H04W 4/08; H04W 76/023; H04W 48/12; H04W 8/005; H04L 67/10
See application file for complete search history.

(56) References Cited

U.S. PATENT DOCUMENTS 8,134,934 B2    3/2012 Chen et al.
8,472,983 B1    6/2013 Kapoor et al.
(Continued)

FOREIGN PATENT DOCUMENTS

EP    1976165 A2    10/2008

OTHER PUBLICATIONS

ISA/EPO, International Search Report and Written Opinion of the International Searching Authority, Int'l. App. No. PCT/US2014/066615, Mar. 2, 2015, European Patent Office, Rijswijk, NL 11 pgs.
(Continued)

*Primary Examiner* — Un C Cho
*Assistant Examiner* — Jeremy Costin
(74) *Attorney, Agent, or Firm* — Holland & Hart LLP/Qualcomm

(57) ABSTRACT

Methods, apparatuses, and devices are described for wireless communications in which neighborhood area network (NaN) information may be requested and provided in a relatively fast and efficient manner between devices of a NaN. A wireless communication device, such as a station in a wireless communications network, may transmit an active probe request to seek information related to a NaN. The active probe request may be a NaN specific probe request, or may be transmitted from a station as part of an active scan for wireless network infrastructure other than NaN devices (e.g., as part of a scan for an AP in a BSS). An AP or master device of the NaN may receive the probe request and generate a NaN discovery response, which may include information that the requesting device may use for connecting to a device in the NaN.

26 Claims, 15 Drawing Sheets

(56) References Cited

U.S. PATENT DOCUMENTS

| | | | |
|---|---|---|---|
| 8,520,704 B2 | 8/2013 | Li et al. | |
| 2003/0117991 A1 | 6/2003 | Beyer et al. | |
| 2005/0128988 A1* | 6/2005 | Simpson | H04W 48/16 370/338 |
| 2009/0013081 A1 | 1/2009 | Laroia et al. | |
| 2009/0016255 A1 | 1/2009 | Park | |
| 2010/0322213 A1* | 12/2010 | Liu | H04L 67/16 370/338 |
| 2011/0161697 A1* | 6/2011 | Qi | G06F 1/3209 713/320 |
| 2012/0113971 A1* | 5/2012 | Giaretta | H04W 48/20 370/338 |
| 2013/0031367 A1 | 1/2013 | Mao et al. | |
| 2013/0231151 A1* | 9/2013 | Kneckt | H04W 40/246 455/515 |
| 2013/0281056 A1 | 10/2013 | Abraham et al. | |
| 2013/0294232 A1 | 11/2013 | Segev et al. | |
| 2013/0294270 A1* | 11/2013 | Yang | H04W 48/16 370/252 |
| 2014/0185598 A1* | 7/2014 | Canpolat | H04W 48/16 370/338 |
| 2014/0192793 A1 | 7/2014 | Abraham et al. | |
| 2014/0242985 A1* | 8/2014 | Kneckt | H04W 48/16 455/434 |
| 2015/0036540 A1* | 2/2015 | Kasslin | H04W 48/18 370/254 |
| 2015/0139217 A1* | 5/2015 | Qi | H04W 56/001 370/350 |

OTHER PUBLICATIONS

Wi-Fi Alliance Technical Committee et al., Wi-Fi Peer-to-Peer (P2P) Technical Specification, Version 1.2, Dec. 14, 2011, pp. 1-159, XP008165048, Wi-Fi Alliance.

ISA/EPO, International Search Report and Written Opinion of the International Searching Authority, Int'l. App. No. PCT/US2013/076642, Apr. 28, 2014, European Patent Office, Rijswijk, NL 23 pgs.

* cited by examiner

METHODS AND APPARATUS FOR NEIGHBORHOOD AREA NETWORK DETECTION

CROSS REFERENCES

The present Application for Patent claims priority to U.S. Provisional Patent Application No. 61/910,813 by Shukla et al., entitled "Methods And Apparatus For Neighborhood Area Network Detection," filed Dec. 2, 2013, assigned to the assignee hereof, and expressly incorporated by reference herein.

The present Application for Patent is related to the following U.S. Patent Applications: U.S. Provisional Patent Application No. 61/749,207 by Abraham, et. al., entitled "SYSTEMS AND METHODS FOR HIERARCHICAL TIME SOURCE USAGE IN NEAR-ME NETWORK DISCOVERY AND SYNCHRONIZATION," filed Jan. 4, 2013, assigned to the assignee hereof, and expressly incorporated by reference herein; and U.S. patent application Ser. No. 14/108,014, by Abraham et al., entitled "SYSTEMS AND METHODS FOR HIERARCHICAL TIME SOURCE USAGE IN NEAR-ME AREA NETWORK DISCOVERY AND SYNCHRONIZATION," filed Dec. 16, 2013, assigned to the assignee hereof, and expressly incorporated by reference herein.

BACKGROUND

The following relates generally to wireless communications, and more specifically to neighborhood area network (NaN) detection techniques of a communications device. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Wireless Local Area Networks (WLANs), such as Wi-Fi (IEEE 802.11) networks are widely deployed and used.

A wireless multiple-access communications system may include a number of access points, each simultaneously supporting communication for multiple devices. Access points may communicate with devices on downstream and upstream links. Each access point (AP) has a coverage range, which may be referred to as the coverage area of the AP. In WLANs, a basic service set (BSS) may provide a building-block of a WLAN. A simple BSS may include a single AP together with all associated devices, often referred to as stations (STAs). The access point may act as a master to control the stations within that BSS.

Similarly, a NaN may provide a building block of a WLAN, and may provide network communications with certain stations associated with the NaN or with stations that may run an application for connecting with the NaN. A NaN may include one or more APs together with associated devices. The NaN may also include one or more masters, which may include a station acting as a master device through direct connections with other stations without connecting through a dedicated AP, such as through Wi-Fi Direct (also known as P2P). In some deployments a NaN may include an anchor master device and one or more other master devices. The anchor master device may be located at a fixed location, and the one or more other master devices may be portable and battery operated devices, for example.

Information to be used in establishing connections with a NaN AP or master device may include synchronization and timing information for the NaN cluster, for example. Communication of this information may be utilized relatively frequently as new devices come within the area of a NaN. It may be desirable to provide relatively fast and efficient communication of the connection information while also having relatively low power consumption related to the communication of the connection information across devices of a NaN.

SUMMARY

Described examples are directed to systems, methods, and apparatuses for communicating in a NaN, in which NaN information may be requested and provided in a relatively fast and efficient manner. According to some aspects, a wireless communication device, such as a station in a wireless communications network, may transmit an active probe request to seek information related to a NaN. The active probe request may be a NaN specific probe request, or may be transmitted from a station as part of an active scan for wireless network infrastructure other than NaN devices (e.g., as part of a scan for an AP in a BSS). An AP and master device of the NaN may receive the probe request and generate a NaN discovery response, which may include information that the requesting device may use for connecting to a device in the NaN.

A method for wireless communications, may include receiving neighborhood area network (NaN) discovery information, the NaN discovery information being received in an unsolicited beacon or in response to a probe request; and identifying a subset of the NaN discovery information for use in connecting to a NaN device in a wireless communications network. The method may further include transmitting a probe request; and wherein receiving the NaN discovery information is in response to receiving the probe request. The probe request may include a NaN discovery element. Receiving the NaN discovery information may include receiving the NaN discovery information in at least one of the group consisting of: a probe response, a beacon signal, and a discovery response public action frame. The NaN discovery information may include information selected from the group consisting of NaN cluster information and NaN device information. Identifying the subset of the NaN discovery information may include determining one or more of synchronization beacon timing or discovery timing of the NaN device based on the NaN cluster information.

The probe request may be transmitted as part of an active scan for wireless network infrastructure other than NaN devices. The wireless network infrastructure may include, for example, a peer-to-peer (P2P) device, a soft-Access Point device, an independent basic service set (IBSS) device, a mesh device, or a station (STA) device. When the probe request is sent by one of these devices, the device sending the probe request may be collocated with the NaN devices and the probe request may include NAN discovery information. Receiving the information may include receiving the NaN discovery information from one or more of the NaN device or another network element of the wireless communications network.

An apparatus for wireless communications may include a receiver to receive neighborhood area network (NaN) discovery information, the NaN discovery information being received in an unsolicited beacon or in response to a probe request; and a processor to identify a subset of the NaN discovery information for use in connecting to a NaN device in a wireless communications network. The apparatus may include a transmitter to transmit a probe request; wherein the receiver receives the NaN discovery information in response to receiving the probe request. The processor, receiver, and transmitter may implement one or more aspects of the method described above.

A method for wireless communications at a neighborhood area network (NaN) device in a wireless communications network may include determining whether NaN discovery information is to be transmitted responsive to a probe request; and transmitting the NaN discovery information responsive to the determination. The method may further include receiving a probe request from a station; and transmitting the NaN discovery information may be in response to receiving the probe request. The probe request may be transmitted as part of an active scan for wireless network infrastructure other than NaN devices. The wireless network infrastructure other than NaN devices may include at least one of the group consisting of: a P2P device, a soft-Access Point device, an IBSS device, a mesh device, and a STA device. When the probe request is sent by one of these devices, the device sending the probe request may be collocated with the NaN device, and the probe request may include NAN discovery information. The NaN discovery information may be one of the group consisting of: NaN cluster information and NaN device information.

Determining whether the NaN discovery information is to be transmitted may include: determining whether the probe request includes a NaN discovery element; determining when a next scheduled transmission of a beacon signal comprising NaN discovery information is to occur; determining that the NaN discovery information is to be transmitted when a time until the next scheduled transmission exceeds a threshold time period; determining an elapsed time since NaN discovery information has been transmitted; or determining that the NaN discovery information is to be transmitted when the elapsed time exceeds a threshold elapsed time period.

The NaN discovery information may be transmitted in a message from the group consisting of: a probe response message, a beacon signal message, and a discovery response publication action frame. The probe response may include, for example, a public action frame with NaN cluster information. Determining whether the NaN discovery information is to be transmitted may include determining that transmitting the NaN discovery information is to be skipped when another NaN device has transmitted NaN discovery information responsive to the probe request.

An apparatus for wireless communications at a neighborhood area network (NaN) device in a wireless communications network may include a processor to determine whether NaN discovery information is to be transmitted responsive to a probe request; and a transmitter to transmit the NaN discovery information responsive to the determination. The method may further include a receiver to receive a probe request; wherein the transmitter transmits the NaN discovery information in response to receiving the probe request. The NaN discovery information may include NaN cluster information or NaN device information. The processor, receiver, or transmitter may be configured to implement one or more aspects of the corresponding method described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
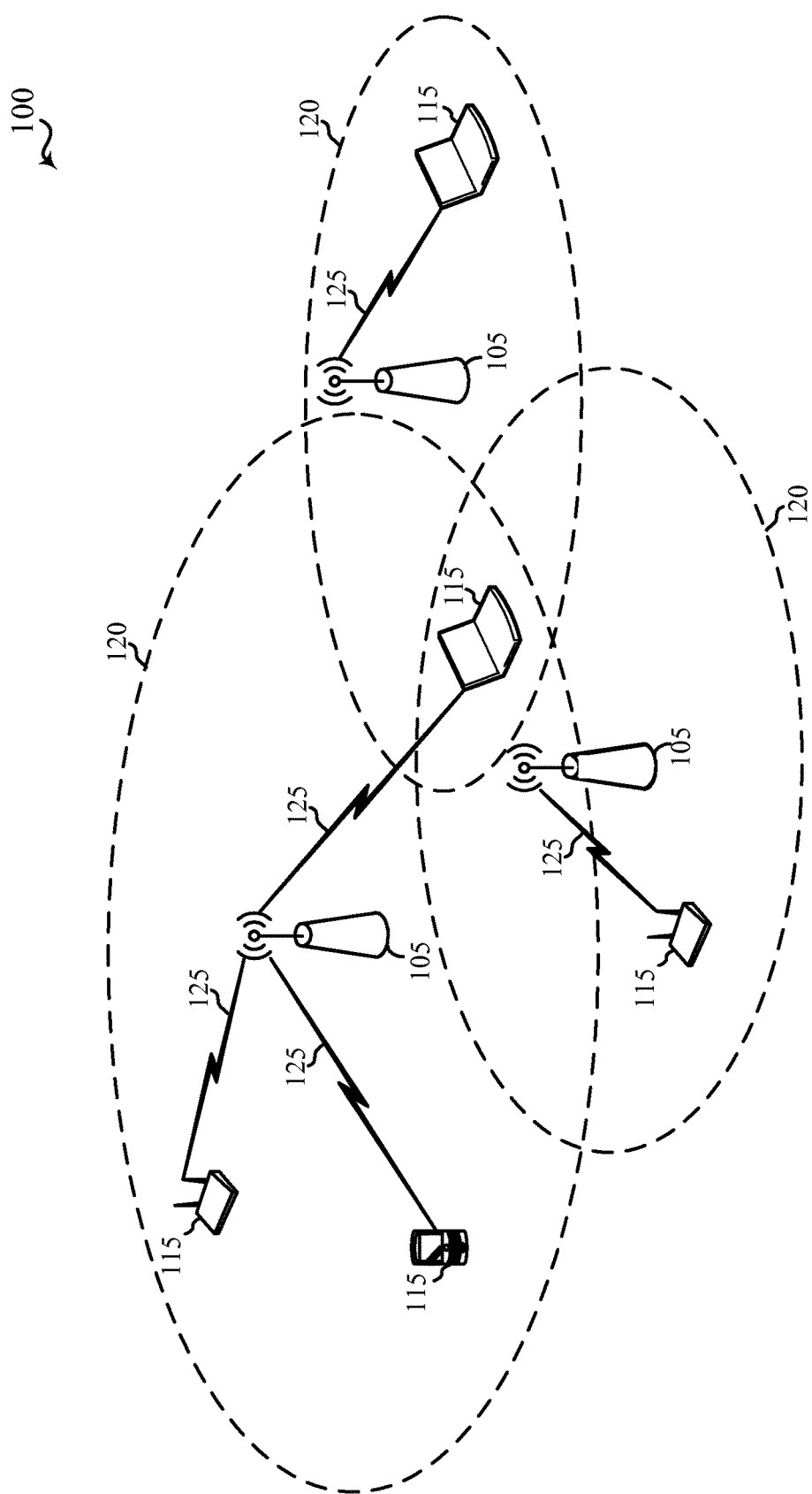
FIG. 1 shows a diagram that illustrates an example of a wireless local area network (WLAN) according to various examples.

Described examples are directed to methods, devices, and apparatuses for wireless communications in which neighborhood area network (NaN) information may be requested and provided in a relatively fast and efficient manner. According to some aspects, a wireless communication device, such as a station in a wireless communications network, may transmit an active probe request to seek information related to a NaN. The active probe request may be a NaN specific probe request, or may be transmitted from a station as part of an active scan for wireless network infrastructure other than NaN devices (e.g., as part of a scan for an AP in a BSS). An AP or master device of the NaN may receive the probe request and generate a NaN discovery response, which may include information that the requesting device may use for connecting to a device in the NaN.

The various techniques described herein for wireless communications in a NaN are described with respect to WLAN or Wi-Fi networks, some of which may operate in a peer-to-peer configuration. A WLAN or Wi-Fi network may refer to a network that is based on the protocols described in the various IEEE 802.11 standards (e.g., IEEE 802.11a/g, 802.11n, 802.11 ac, 802.11 ah, etc.), for example. However, the same or similar techniques may also be used in any wireless network (e.g., a cellular network). For example, the same or similar techniques may be used for various wireless communications systems such as cellular wireless systems, Peer-to-Peer wireless communications, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM or OFDMA include Ultra Mobile Broadband (UMB), Evolved UTRA (E-UTRA), Wi-Fi, IEEE 802.16 (WiMAX), IEEE 802.20, Flash-OFDM, etc. UTRA and E-UTRA are part of Universal Mobile Telecommunication System (UMTS). 3GPP Long Term Evolution and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a diagram 100 that includes an example of a WLAN or Wi-Fi network. An access point (AP) 105 (i.e., network device) may generate a wireless local area network, such as an IEEE 802.11 network, with client devices 115. The client devices 115, also referred to as wireless stations, stations, or STAs, may be distributed or deployed within a coverage area 120 of the WLAN. Each of the stations 115 may associate and communicate (using communication links 125) with one of the APs 105. Each AP 105 has a coverage area 120 such that stations 115 within that area can typically communicate with the AP 105. As shown in FIG. 1, a station 115 can be covered by more than one AP 105 and can therefore associate with different APs at different times depending on which one provides a more suitable connection. A set of stations 115 that communicate with each other may be referred to as a basic service set (BSS). An extended service set (ESS) is a set of connected BSSs and a distribution system (DS) (not shown) may be used to connect access points in an extended service set.

In some instances, a subset of the APs 105 or several of the stations 115 may connect to each other to establish a neighborhood area network (NaN). A NaN may be established for network communications in a relatively small geographic area, for example. In some deployments, a NaN may provide communications directed to certain devices or to devices that may be running certain applications. The devices, or applications may cause a station 115 to seek to connect to the NaN. In some cases, several stations 115 may form a NaN that does not include an AP 105, through the establishment of a peer-to-peer network (e.g., a Wi-Fi Direct multi-client network). In this type of network or group, one of the stations (clients) may operate as the access point for the group and is typically referred to as the master. One of the stations may operate as an anchor master, and one or more other stations may operate as masters. FIGS. 2-11 described below provide additional details on various aspects of NaNs and requesting/providing NaN information for use in connection a station 115 with one or more NaN devices.

Figure 2A:
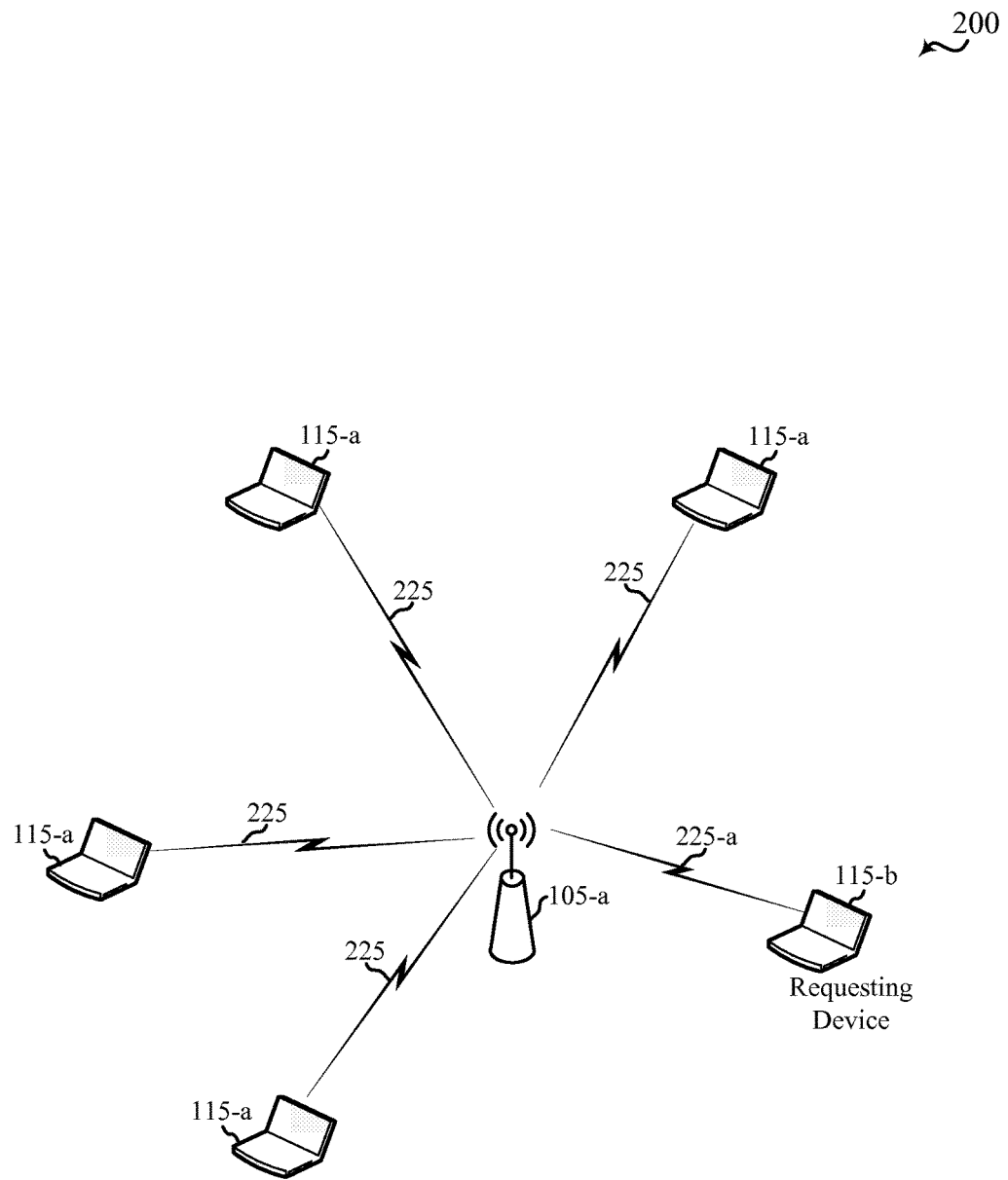
FIG. 2A shows a diagram that illustrates an example of a NaN cluster according to various examples.

Referring to FIG. 2A, a wireless communications system 200, which may be referred to as a NaN cluster, is shown that illustrates multiple stations 115-*a* configured in a NaN that communicate with an AP 105-*a* using communication links 225. In this example, a requesting device 115-*b* may desire to connect with devices in the NaN cluster 200, and may transmit a NaN probe request using communication link 225-*a*. The stations 115-*a* and 115-*b* may be examples of the stations 115 of FIG. 1. Likewise, AP 105-*a* may be examples of the APs 105 of FIG. 1.

NaN information for connection with AP 105-*a* (or other NaN devices 115-*a*) may be periodically transmitted in a NaN discovery beacon from AP 105-*a*. In this type of deployment, the NaN scan is passive, and requesting device 115-*b* monitors a channel for a NaN discovery beacon. AP 105-*a* may transmit the NaN discovery beacon once every 200 milliseconds (ms) using a predefined channel in a radio frequency spectrum used by the wireless communications system 200, such as, for example, channel 6 in an established Wi-Fi system. In such deployments, requesting device 115-*b* may have to monitor the identified channel for 200 ms to receive a NaN discovery beacon. Furthermore, requesting device 115-*b* in some cases, such as in noisy environments, may not reliably receive the beacon transmissions, this resulting in additional monitoring to try to detect the beacon signal. As requesting device 115-*b* may be a portable, battery operated, device, it may be desirable to reduce the time period used for the additional monitoring. Furthermore, in some cases, requesting device 115-*b* may monitor for multiple NaNs, thereby adding further delays and power consumption associated with monitoring for multiple NaNs.

In addition to NaN discovery beacons, an active scan may be used to detect and connect to one or more NaN devices. The active scan may include transmission of a NaN probe request by requesting device 115-*b* using communication link 225-*a*. AP 105-*a* may transmit a NaN discovery response in response to receiving NaN probe request from requesting device 115-*b*. The NaN discovery response, as will be described in more detail below, may include information for connecting with AP 105-*a* or one or more other NaN devices 115-*a* in a NaN cluster.

The wireless communications system 200 may provide a concurrent NaN along with soft-AP, P2P, IBSS, or mesh-based networks, and therefore a requesting device, such as requesting device 115-*b*, seeking to access AP 105-*a* would have to attempt an active scan using probe requests to gain access to the other network type. Thus, the requesting device 115-*b* seeking NaN access may include NaN capabilities information with the existing probe request for access to the soft-AP, P2P, IBSS, or mesh-based network. In other examples, a stand-alone NaN probe request may be transmitted from requesting device 115-*b* that has a similar structure and information as existing probe requests for soft-AP, P2P, IBSS, or mesh-based networks. As mentioned, AP 105-*a* may receive the NaN probe request and transmit a NaN discovery response in response to receiving the NaN probe request. In addition to the requesting device 115-*b*, other devices 115-*a* (or other wireless devices not shown that may desire NaN access) may receive the NaN discovery response and therefore not need to monitor the identified channel for a full time period that may otherwise have to detect a NaN discovery beacon from AP 105-*a*, and thus periodic responses to the NaN probe requests may help reduce power consumption of the system 200 as a whole.

The NaN discovery response may include a number of information elements to indicate to the requesting device 115-*b* (or associated NaN devices 115-*a*) details about the AP 1-5-*a* for establishing a wireless connection (e.g., synchronization information, device name, MAC address, group capabilities, operating channel, and listen channel). In some instances, the AP 105-*a* may indicate that channel 6 (CH6) is to be used as the listen channel in order to reduce scan time/NaN resumption time.

Figure 2B:
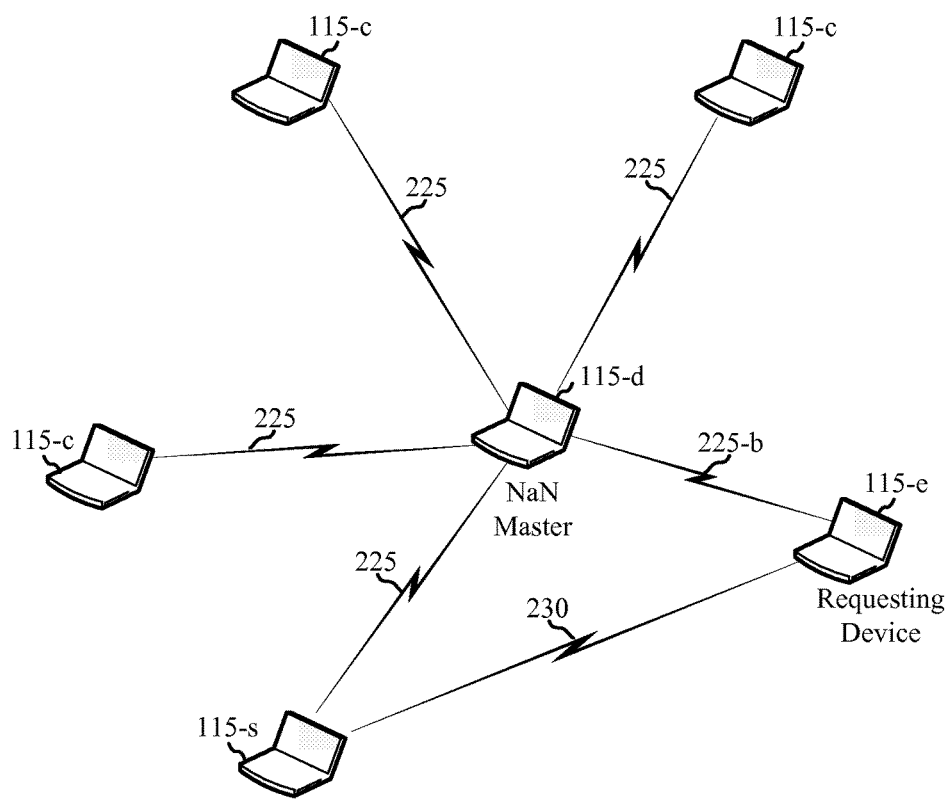
FIG. 2B shows a diagram that illustrates an example of another NaN cluster according to various examples.

Referring to FIG. 2B, another wireless communications system 250, which may be referred to as a NaN cluster is shown that illustrates multiple stations 115-*c* configured in NaN and communicate with an NaN master 115-*d* using communication links 225. In this example, a requesting device 115-*e* may seek access to the NaN cluster 250, and may transmit a NaN probe request using communication link 225-*b*. The stations 115-*c*, 115-*d*, and 115-*e* may be examples of the stations 115 of FIG. 1 or FIG. 2A.

In the example of FIG. 2B, the NaN master 115-*d* may perform similar functions as described above with respect to AP 105-*a* in FIG. 2A. More specifically, NaN master 115-*d* (or other NaN devices 115-*c*) may periodically transmit a NaN discovery beacon. For example, discovery beacon may be transmitted from another master device 115-*s* using communication link 230. Requesting device 115-*e*, similarly as discussed above, may use an active scan to detect and connect to one or more NaN devices. The active scan may include transmission of a NaN probe request by requesting device 115-*e* using communication link 225-*b* or communications link 230. NaN master 115-*d* (or other master device) may transmit a NaN discovery response in response to receiving NaN probe request, as discussed above.

In situations where NaN master 115-*d* (or other master device) may be battery operated, the device 115-*d* may determine that another device has not responded to the NaN probe request prior to transmitting the NaN discovery response. The NaN discovery response, as will be described in more detail below, may include information for connecting with NaN master 115-*d* or one or more other NaN devices 115-*c* in a NaN cluster 250.

The wireless communications system 250 may provide concurrent NaN along with soft-AP, P2P, IBSS, or mesh-based networks, and therefore a requesting device, such as requesting device 115-*e*, would have to attempt an active scan using probe requests for access to the other network type. Thus, the requesting device 115-*e* seeking NaN access may include NaN capabilities information with the existing probe request for access to the soft-AP, P2P, IBSS, or mesh-based networks. In other examples, a stand-alone NaN probe request may be transmitted from requesting device 115-*e* that has a similar structure and information as existing probe requests for soft-AP, P2P, IBSS, or mesh-based networks. As mentioned, NaN master 115-*d* may receive the NaN probe request and transmit a NaN discovery response in response to receiving the NaN probe request. Similarly as described above, in addition to the requesting device 115-*e*, other devices 115-*c* (or other wireless devices not shown that may desire NaN access) may receive the NaN discovery response and therefore not need to monitor the identified channel for a full time period that may otherwise have to detect a NaN discovery beacon from NaN master 115-*d*, and thus periodic responses to the NaN probe requests may help reduce power consumption of the system 250 as a whole. The NaN discovery response may include a number of information elements, such as described above, for example.

Figure 3:
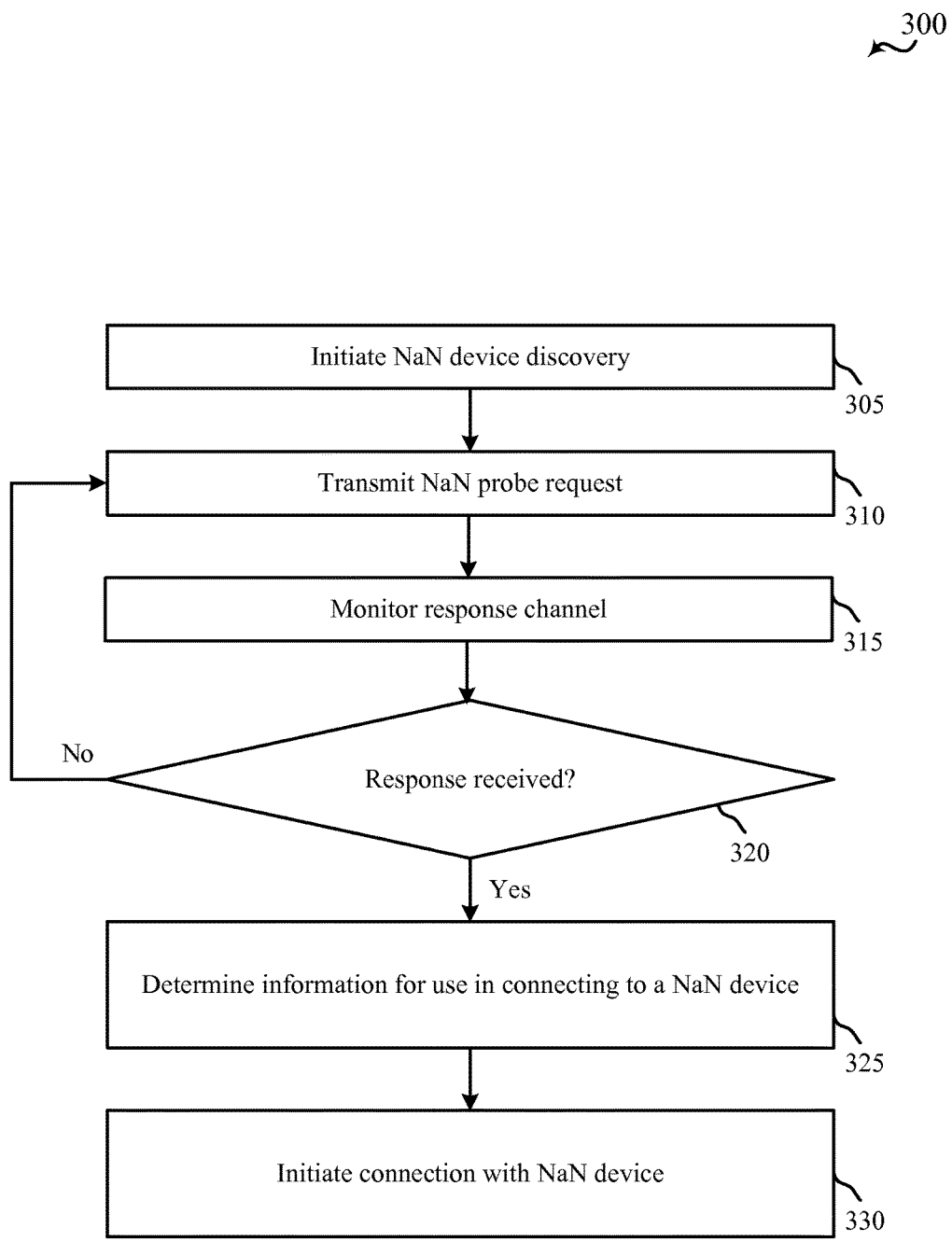
FIG. 3 shows a flowchart that illustrates an example of NaN discovery and connection according to various examples.

FIG. 3 is a flowchart illustrating an example of a method 300 for wireless communications in a NaN, in accordance with various examples. For clarity, the method 300 is described with reference to one of the stations, devices, or APs 105, 115, or 505 shown in FIG. 1, 2A, 2B, 5A, 5B, 5C, 6, 7, or 8. In one example, one of the stations may execute one or more sets of codes to control the functional elements of the station to perform the functions described below.

At block 305, a device (e.g., station operating in a WLAN) may initiate NaN device discovery. The device may initiate NaN device discovery in response to entering a coverage area of a WLAN, for example, and seeking to determine availability of a NaN, or multiple NaNs. A device may run an application associated with one or more NaNs that may seek to determine availability of an associated NaN. For example, a user of the device may be subscribed to a service that may provide specific content or enhanced network connectivity through various different NaNs, and the device may seek to determine whether one or more of the NaNs are available.

At block 310, the device transmits a NaN probe request. According to some examples, the probe request may include a NaN discovery element, which may provide information related to the requesting device and the NaN capabilities of the device, for example. In this case, a NaN device receiving the probe request may also determine NaN capability of the device transmitting the probe request.

The probe request may be transmitted as part of an active scan for wireless network infrastructure other than NaN devices. The wireless network infrastructure may include, for example, one or more of a peer-to-peer (P2P) device, a soft-Access Point device, an independent basic service set (IBSS) device, or a mesh device. The other wireless network infrastructure devices may be connected to through active scans, which may include established probe requests for these devices. Existing probe requests for the other wireless network infrastructure devices may be modified to include one or more information elements that may include a NaN attribute of the device sending the probe request.

A NaN device, upon reception of a probe request containing a NaN attribute may respond to the probe request and include NaN information or information related to the other wireless network infrastructure device. For example, a NaN anchor master may reply by transmitting a discovery beacon if it has not transmitted discovery beacon for a first predetermined duration (e.g., 20 ms), and it has not scheduled to transmit a discovery beacon for a second predetermined duration (e.g., 20 ms). Similarly, a NaN master device may reply in a similar manner. In many deployments, there may be a relatively low number of masters in a NaN cluster and all non-master devices may get the benefit of the additional discovery beacons, thereby saving power in the overall system. Probe requests that do not contain a NaN attribute may be ignored by NaN devices. NaN attributes, according to some examples, may be included as one or more vendor specific elements embedded in probe requests. In other examples, a NaN specific information element may be included in probe requests.

At block 315, the device may monitor a response channel to determine whether a NaN discovery response is received. A specified channel may be used to monitor for NaN discovery responses. For example, Wi-Fi channel 6 may be monitored for a response, with the channel also corresponding to a channel that may be used for periodic NaN beacon transmissions. Thus, a device that receives the probe request may respond, such as with a NaN beacon transmission. In other examples, a separate NaN discovery response may be transmitted, which may include synchronization or timing information for NaN beacon transmissions, or may include other information for establishing a connection with a NaN device.

At block 320, it is determined whether a response is received. If a response is not received, the operations of block 310 are performed to again transmit a probe request. These operations may continue until a timeout period has expired, or until a response is received.

If a response is received at block 320, the device may determine information for use in connecting to a NaN device of the NaN cluster, as indicated at block 325. The information may include, for example, NaN cluster information which may include synchronization beacon timing or discovery timing information for NaN beacon transmissions, or may include other information for establishing a connection with a NaN device.

At block 330, the device initiates a connection with the NaN device. The connection may be used to communicate NaN related information, or to provide network connectivity to the device through the NaN.

Figure 4:
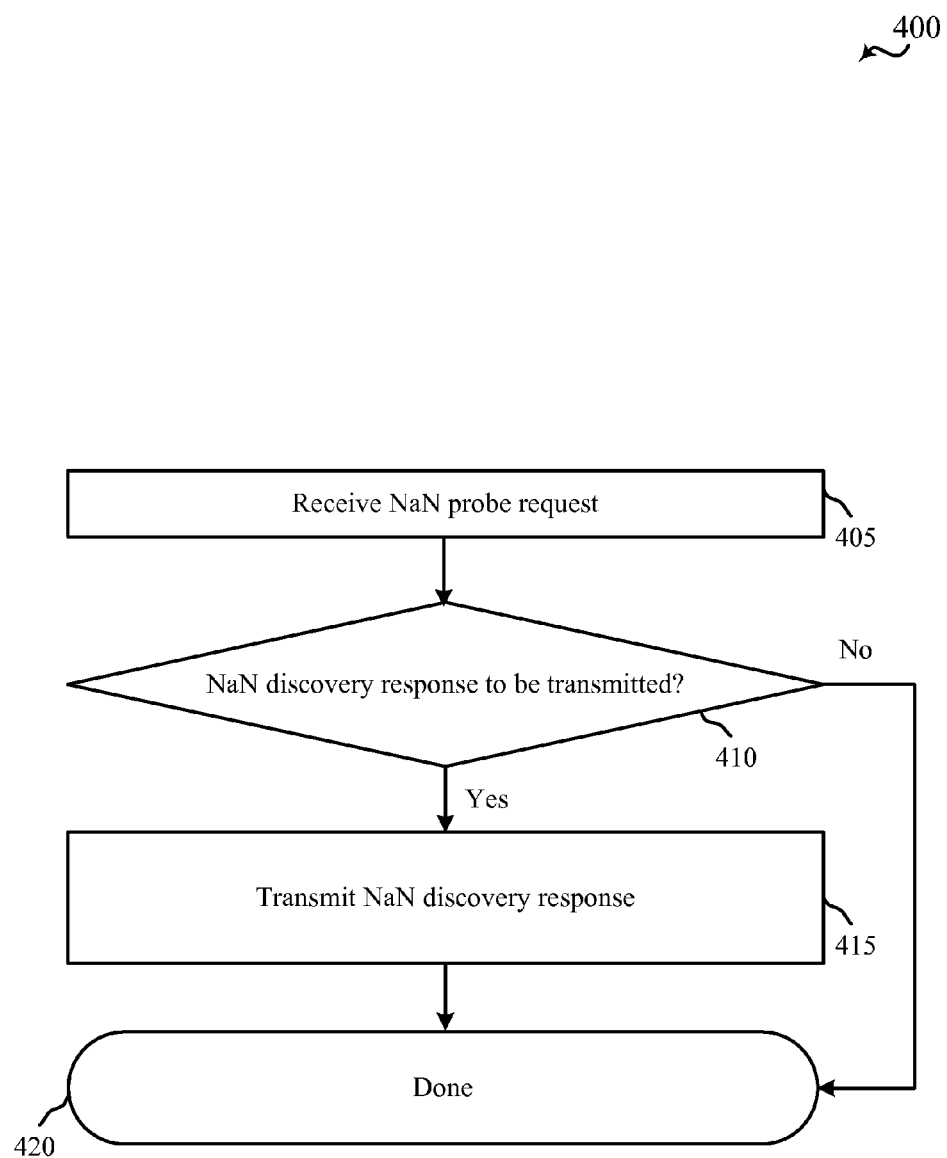
FIG. 4 shows a flowchart that illustrates an example of a NaN discovery probe receipt and response according to various examples.

FIG. 4 is a flowchart illustrating an example of a method 400 for wireless communications in a NaN, in accordance with various examples. For clarity, the method 400 is described with reference to one of the APs, stations, devices, or APs 105, 115, or 505 shown in FIG. 1, 2A, 2B, 5A, 5B, 5C, 6, 7, or 8. In one example, one of the stations or APs may execute one or more sets of codes to control the functional elements of the station or AP to perform the functions described below.

At block 405, a NaN probe request is received. The probe request may be transmitted as part of an active scan for wireless network infrastructure other than NaN devices. The wireless network infrastructure may include, for example, one or more of a peer-to-peer (P2P) device, a soft-Access Point device, an independent basic service set (IBSS) device, or a mesh device. Existing probe requests for the other non-NaN devices may be modified to include one or more information elements that may include a NaN attribute of the device sending the probe request.

At block 410, it is determined whether a NaN discovery response is to be transmitted responsive to the probe request. When no discovery response is to be transmitted, the process proceeds to block 420 and is done, otherwise the process proceeds to block 415. Determining whether the NaN discovery response is to be transmitted may include determining whether the probe request includes a NaN discovery element. The determination may be made through determining when a next scheduled transmission of a beacon signal that includes NaN discovery information is to occur, and determining that the NaN discovery response is to be transmitted when a time until the next scheduled transmission exceeds a threshold time period (e.g., 20 ms). In other examples, the determination may be made through determining an elapsed time since NaN discovery information has last been transmitted, and determining that the NaN discovery response is to be transmitted when the elapsed time exceeds a threshold elapsed time period (e.g., 20 ms).

At block 415, a NaN discovery response is transmitted responsive to the probe request. The NaN discovery response may be a stand-alone response or may be a NaN beacon signal, similarly as described above. As mentioned above, two or more NaN master devices may be present in a NaN cluster. In this case, a NaN device may determine that another NaN device has transmitted a NaN discovery response responsive to the probe request, in which case no further transmission occurs.

The NaN discovery response may include a public action frame referred to as "NaN Discovery Response," and may be defined as having mostly or entirely containing NaN cluster information. The response may include, for example, a 26 byte 802.11 header, followed by NaN cluster information in 9 byte and 13 byte information elements. The NaN cluster information may include, for example, information that may be used by a requesting device to identify a synchronization beacon and discovery timings. Following block 415, operations are complete, as indicated at block 420.

Figure 5A:
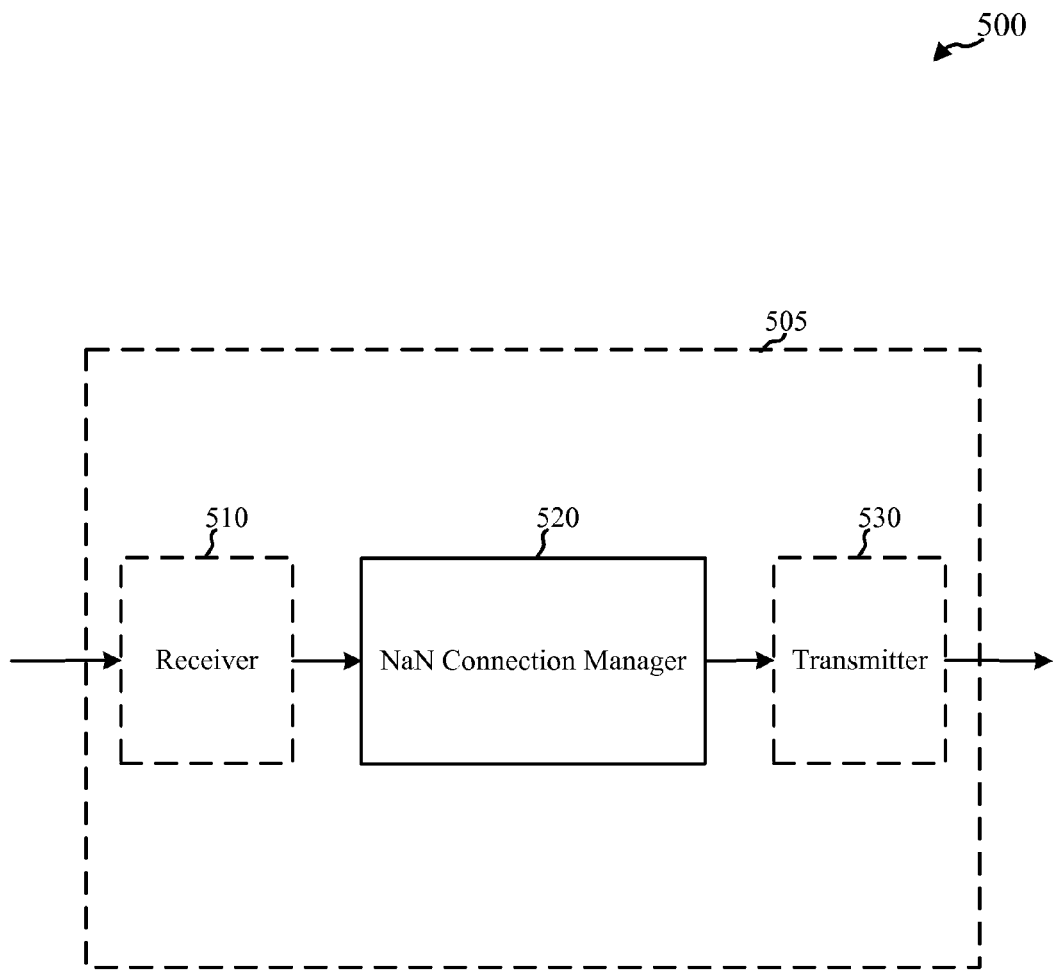
FIGS. 5A, 5B, and 5C show diagrams that illustrate examples of devices (e.g., stations or access points) for NaN implementation in wireless communications according to various examples.

FIG. 5A shows a diagram 500 having a device 505 for use in wireless communications that support NaN probe requests or responses. The device 505 may be an example of one or more aspects of one of the stations 115 or APs 105 described with reference to FIG. 1, 2A, 2B, 6, 7, or 8. The device 505, or portions of it, may also be a processor. The device 505 may include a receiver 510, a NaN connection manager 520, or a transmitter 530. Each of these components may be in communication with each other.

The receiver 510 may be or include an RF receiver. The RF receiver may include separate receivers for the different bands. For example, the RF receiver may include a receiver (i.e., part of a radio or modem) operable to receive transmissions in one or more Wi-Fi bands (e.g., 2.4 GHz, 5 GHz). The receiver 510 may be used to receive various types of data or control signals (i.e., transmissions) over one or more communication links of a wireless communications system, such as one or more communication links of the WLAN or Wi-Fi networks described with reference to FIG. 1, 2A, or 2B.

The transmitter 530 may be or include an RF transmitter. The RF transmitter may include separate transmitters for the different bands. For example, the RF transmitter may include a transmitter (i.e., part of a radio or modem) operable to transmit in one or more Wi-Fi bands (e.g., 2.4 GHz, 5 GHz). The transmitter 530 may be used to transmit various types of data or control signals (i.e., transmissions) over one or more communication links of the WLAN or Wi-Fi networks described with reference to FIG. 1, 2A, or 2B.

The NaN connection manager 520 may be configured to transmit a NaN probe request or transmit a NaN discovery response through the receiver 510, or the transmitter 530, may be configured to perform NaN probe requests or NaN discovery responses according to techniques similarly as discussed above with respect to FIGS. 1-4, or as discussed below with respect to FIGS. 6-10.

These components of the device 505 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. Other types of integrated circuits may also be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. For example, the NaN connection manager may be embodied in hardware, software, or a mixture of both. Referring briefly to FIG. 6, the NaN connection manager 520 in FIGS. 5A-5C may be embodied in a processor 610 executing instructions in SW 625 stored in memory 620. Alternatively, or in addition, the NaN connection manager may be hardware, firmware, or a separate instruction set being processed in station NaN connection manager 660 (or similar referring to FIGS. 7-8).

Figure 5B:
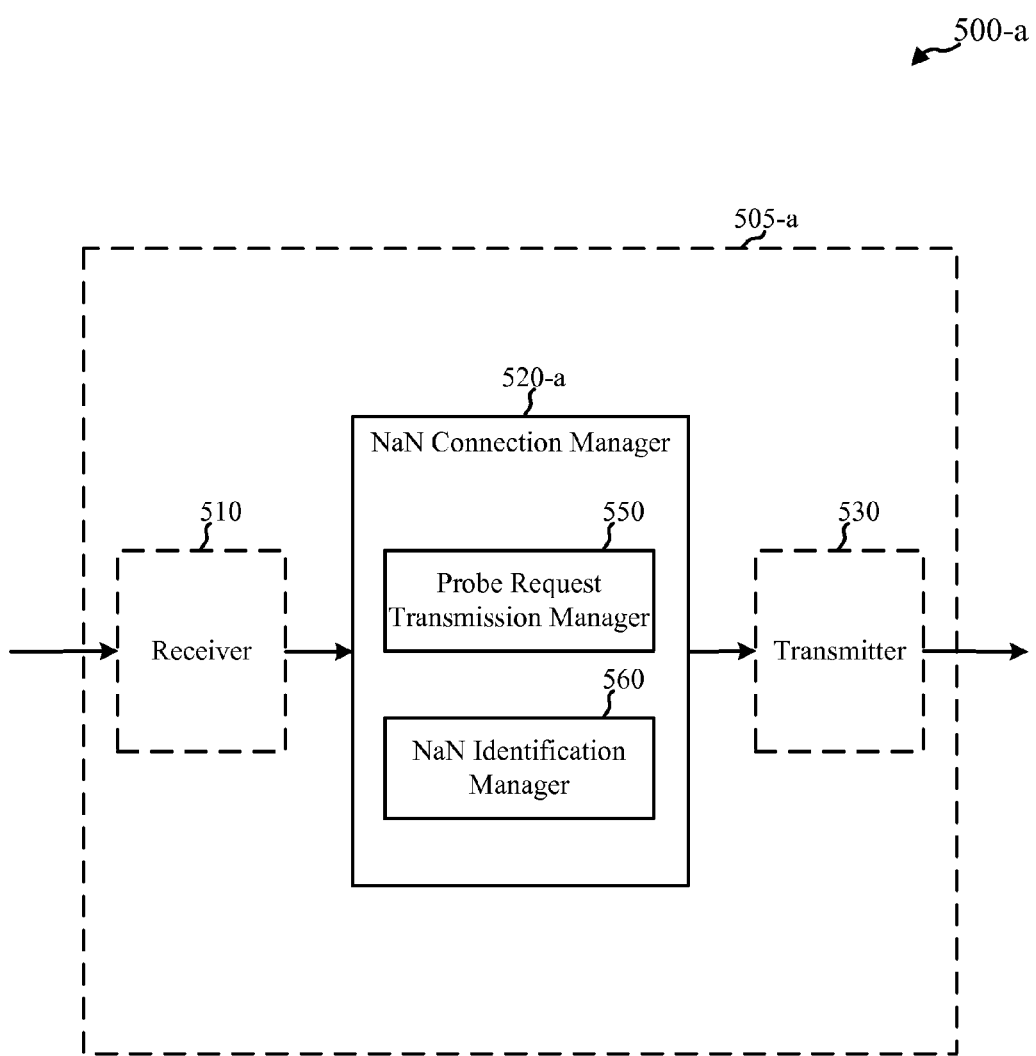
Figure 6:
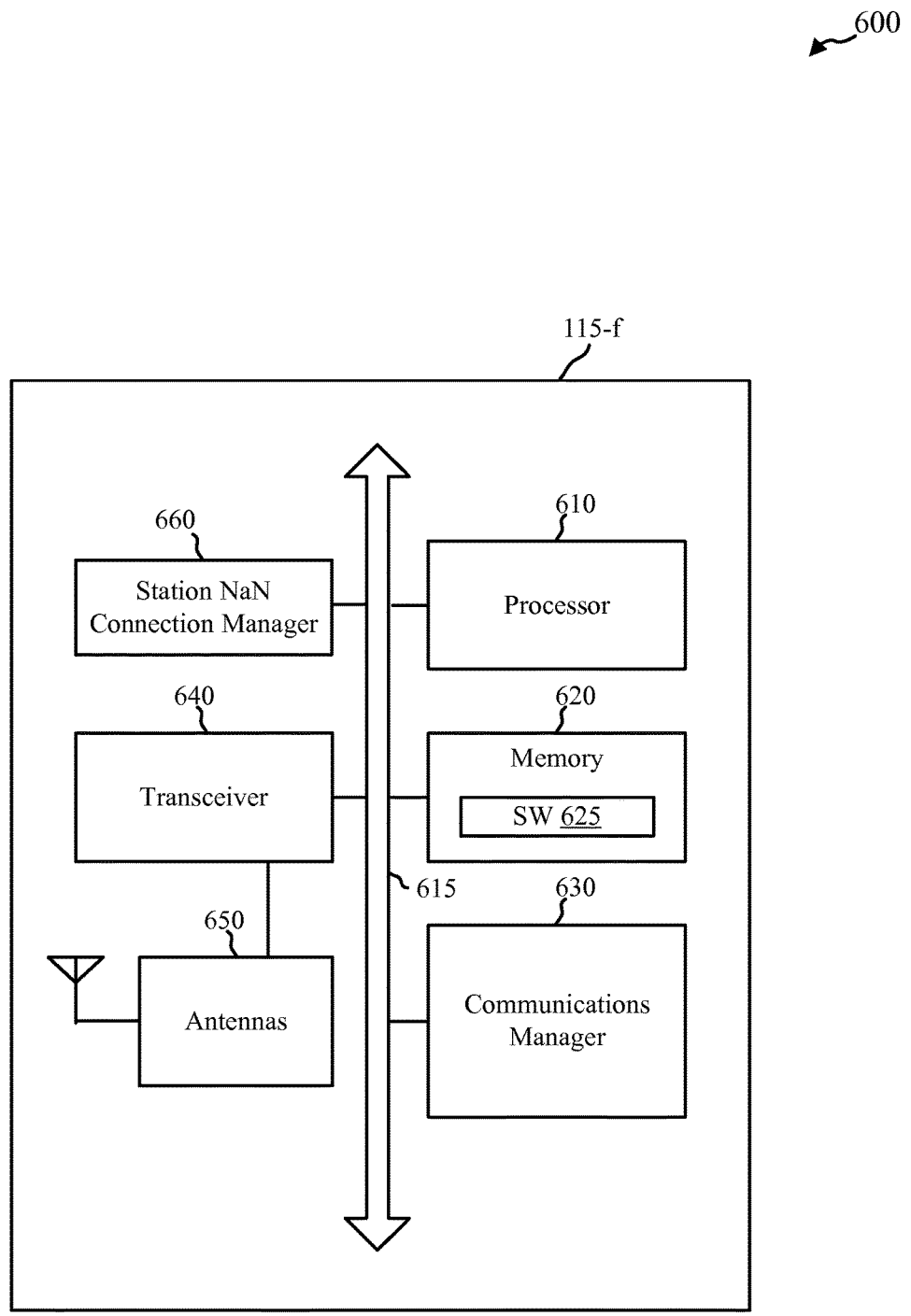
FIG. 6 shows a block diagram that illustrates an example of station architecture according to various examples.

FIG. 5B shows a diagram 500-*a* having a device 505-*a* for use in wireless communications that support NaN probe requests or responses. The device 505 may be an example of one or more aspects of one of the stations 115 described with reference to FIG. 1, 2A, 2B, or 6. The device 505, or portions of it, may also be a processor. The device 505 may include a receiver 510, a NaN connection manager 520-*a*, or a transmitter 530. Each of these components may be in communication with each other.

The receiver 510 may be or include an RF receiver. The RF receiver may include separate receivers for the different bands. For example, the RF receiver may include a receiver (i.e., part of a radio or modem) operable to receive transmissions in one or more Wi-Fi bands (e.g., 2.4 GHz, 5 GHz). The receiver 510 may be used to receive various types of data or control signals (i.e., transmissions) over one or more communication links of a wireless communications system, such as one or more communication links of the WLAN or Wi-Fi networks described with reference to FIG. 1, 2A, or 2B.

The transmitter 530 may be or include an RF transmitter. The RF transmitter may include separate transmitters for the different bands. For example, the RF transmitter may include a transmitter (i.e., part of a radio or modem) operable to transmit in one or more Wi-Fi bands (e.g., 2.4 GHz, 5 GHz). The transmitter 530 may be used to transmit various types of data or control signals (i.e., transmissions) over one or more communication links of the WLAN or Wi-Fi networks described with reference to FIG. 1, 2A, or 2B.

The NaN connection manager 520-*a* may include a probe request transmission manager 550, and a NaN identification manager 560. The NaN probe request transmission manager 550 may be configured to handle aspects described with respect to FIG. 1, 2A, 2B, 3, 6, or 9 related to operations and functions associated with NaN detection and connection.

The NaN identification manager 560 may be configured to receive NaN discovery responses and determine information for a NaN connection such as described with respect to FIG. 1, 2A, 2B, 3, 6, or 9 related to operations and functions associated with NaN detection and connection.

These components of the device 505-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 5C:
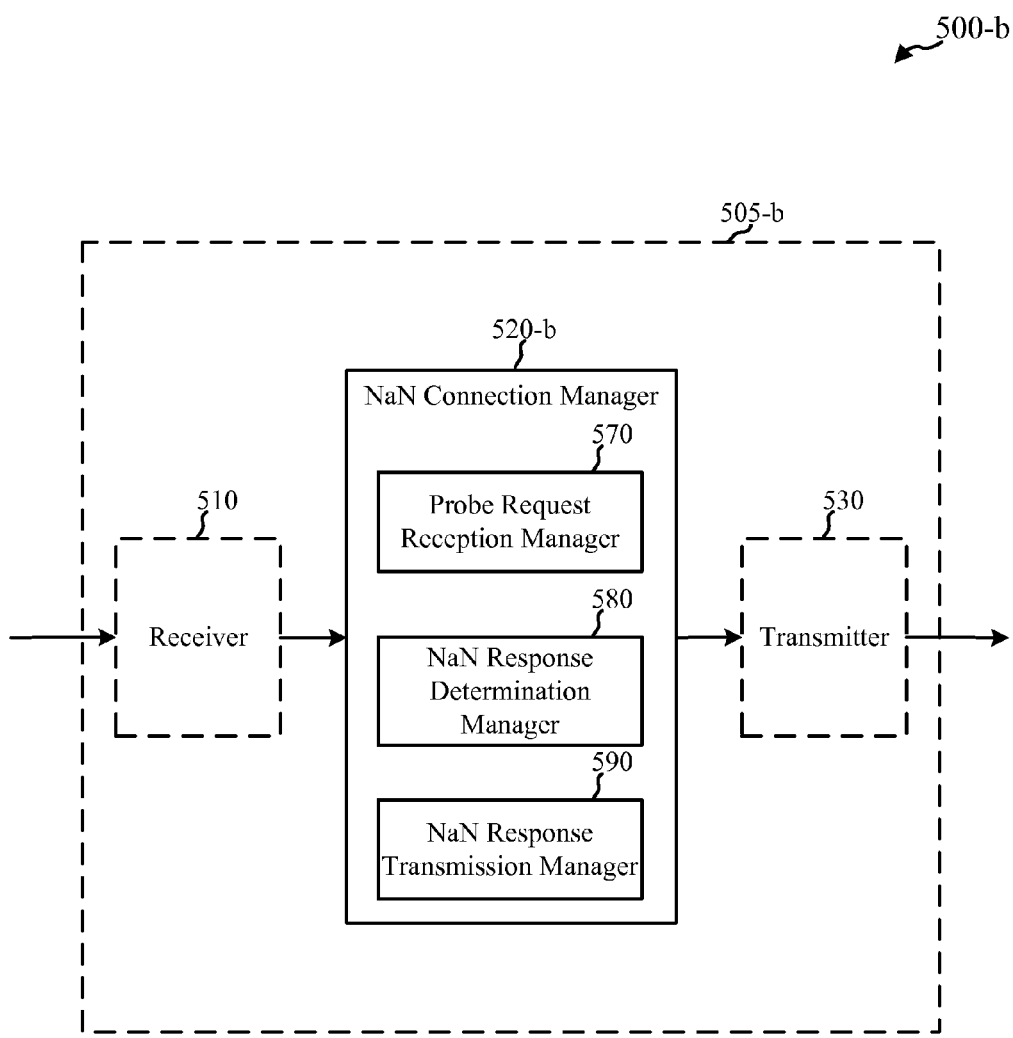

FIG. 5C shows a diagram 500-*b* having a device 505-*b* for use in wireless communications that support NaN probe requests or responses. The device 505 may be an example of one or more aspects of one of the stations 115 or APs 105 described with reference to FIG. 1, 2A, 2B, 7, or 8. The device 505, or portions of it, may also be a processor. The device 505 may include a receiver 510, a NaN connection manager 520-*b*, or a transmitter 530. Each of these components may be in communication with each other.

The receiver 510 may be or include an RF receiver. The RF receiver may include separate receivers for the different bands. For example, the RF receiver may include a receiver (i.e., part of a radio or modem) operable to receive transmissions in one or more Wi-Fi bands (e.g., 2.4 GHz, 5 GHz). The receiver 510 may be used to receive various types of data or control signals (i.e., transmissions) over one or more communication links of a wireless communications system, such as one or more communication links of the WLAN or Wi-Fi networks described with reference to FIG. 1, 2A, or 2B.

The transmitter 530 may be or include an RF transmitter. The RF transmitter may include separate transmitters for the different bands. For example, the RF transmitter may include a transmitter (i.e., part of a radio or modem) operable to transmit in one or more Wi-Fi bands (e.g., 2.4 GHz, 5 GHz). The transmitter 530 may be used to transmit various types of data or control signals (i.e., transmissions) over one or more communication links of the WLAN or Wi-Fi networks described with reference to FIG. 1, 2A, or 2B.

The NaN connection manager 520-*b* may include a probe request reception manager 570, a NaN response determination manager 580, and a NaN response transmission manager 590. The probe request reception manager 570 may be configured to handle aspects described with respect to FIG. 1, 2A, 2B, 4, 7, 8, or 10 related to operations and functions associated with reception of probe requests. The NaN response determination manager 580 may be configured to determine, responsive to received probe requests, whether a NaN response is desired, and determine information for the NaN response, such as described with respect to FIG. 1, 2A, 2B, 4, 7, 8 or 10 related to operations and functions associated with NaN detection and connection. The NaN response transmission manager 590 may be configured to transmit one or more NaN responses as determined by the NaN response determination manager 580, such as described with respect to FIG. 1, 2A, 2B, 4, 7, 8 or 10 related to operations and functions associated with NaN detection and connection.

These components of the device 505-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Turning to FIG. 6, a diagram 600 is shown that illustrates a communications device, or station, 115-*f* configured for NaN-related communication according to various examples. The station 115-*f* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-*f* may have an internal power supply (not shown), such as a small battery, to facilitate mobile operation. The station 115-*f* may be an example of the communications devices 115 or devices 505 and may implement various operations of FIG. 1-5 or 9.

These components of the device 115-*f* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The station 115-*f* may include a processor 610, a memory 620, a communications manager 630, a transceiver 640, antennas 650, and a station NaN connection manager 660. The station NaN connection manager 660 may be an example of the NaN connection managers 520 or 520-*a* of FIG. 5A or 5B. Each of these components may be in communication with each other, directly or indirectly, over one or more buses 615 for example.

The memory 620 may include random access memory (RAM) and read-only memory (ROM). The memory 620 may store computer-readable, computer-executable software (SW) code 625 containing instructions that are configured to, when executed, cause the processor 610 to perform various NaN-related functions described herein. Alternatively, the software code 625 may not be directly executable by the processor 610 but may be configured to cause the computer (e.g., when compiled and executed) to perform functions described herein.

The processor 610 may include an intelligent hardware device, e.g., a CPU, a microcontroller, an ASIC, etc. The processor 610 may process information received through the transceiver 640 or to be sent to the transceiver 640 for transmission through the antennas 650. The processor 610 may handle, alone or in connection with the communications manager 630 or station NaN connection manager 660, various aspects for NaN probe request or NaN discovery response communication as described herein.

The transceiver 640 may be configured to communicate bi-directionally with APs 105 in FIG. 1, 2A, 2B or 8. The transceiver 640 may be implemented as one or more transmitters and one or more separate receivers. The transceiver 640 may include a modem configured to modulate packets and provide the modulated packets to the antennas 650 for transmission, and to demodulate packets received from the antennas 650. While the station 115-*f* may include a single antenna, there may be examples in which the station 115-*f* may include multiple antennas 650.

The components of the station 115-*f* may be configured to implement aspects discussed herein with respect to FIG. 1-5 or 9, and those aspects may not be repeated here for the sake of brevity.

Figure 7:
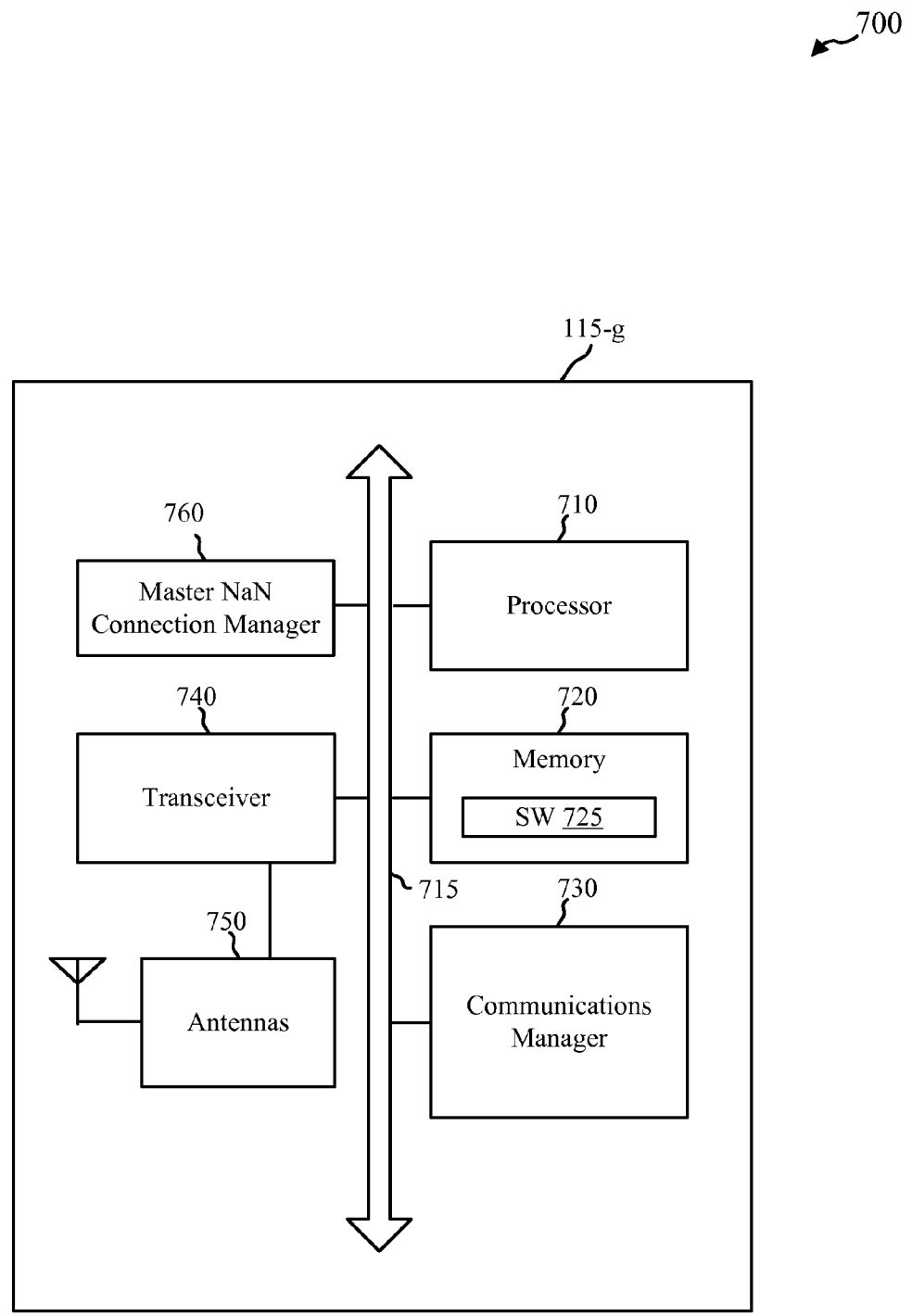
FIG. 7 shows a block diagram that illustrates an example of a master device architecture according to various examples.

Turning to FIG. 7, a diagram 700 is shown that illustrates a communications device, or station, 115-*g* configured for NaN-related communication according to various examples. The station 115-*g* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-*g* may have an internal power supply (not shown), such as a small battery, to facilitate mobile operation. The station 115-*g* may be an example of the communications devices 115 or devices 505 and may implement various operations of FIG. 1-5 or 9. In examples, the station 115-*g* may be configured as a NaN master device.

These components of the device 115-*g* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The station 115-*g* may include a processor 710, a memory 720, a communications manager 730, a transceiver 740, antennas 750, and a master NaN connection manager 760. The master NaN connection manager 760 may be an example of the NaN connection managers 520 or 520-*b* of FIG. 5A or 5C. Each of these components may be in communication with each other, directly or indirectly, over one or more buses 715 for example.

The memory 720 may include RAM and ROM. The memory 720 may store computer-readable, computer-executable software (SW) code 725 containing instructions that are configured to, when executed, cause the processor 710 to perform various NaN-related functions described herein. Alternatively, the software code 725 may not be directly executable by the processor 710 but may be configured to cause the computer (e.g., when compiled and executed) to perform functions described herein.

The processor 710 may include an intelligent hardware device, e.g., a CPU, a microcontroller, an ASIC, etc. The processor 710 may process information received through the transceiver 740 or to be sent to the transceiver 740 for transmission through the antennas 750. The processor 710 may handle, alone or in connection with the communications manager 730 or master NaN connection manager 760, various aspects for NaN probe request or NaN discovery response communication as described herein.

The transceiver 740 may be configured to communicate bi-directionally with APs 105 in FIG. 1, 2A, 2B or 8. The transceiver 740 may be implemented as one or more transmitters and one or more separate receivers. The transceiver 740 may include a modem configured to modulate packets and provide the modulated packets to the antennas 750 for transmission, and to demodulate packets received from the antennas 750. While the station 115-*g* may include a single antenna, there may be examples in which the station 115-*g* may include multiple antennas 750.

The components of the station 115-*g* may be configured to implement aspects discussed herein with respect to FIG. 1-5 or 10, and those aspects may not be repeated here for the sake of brevity.

Figure 8:
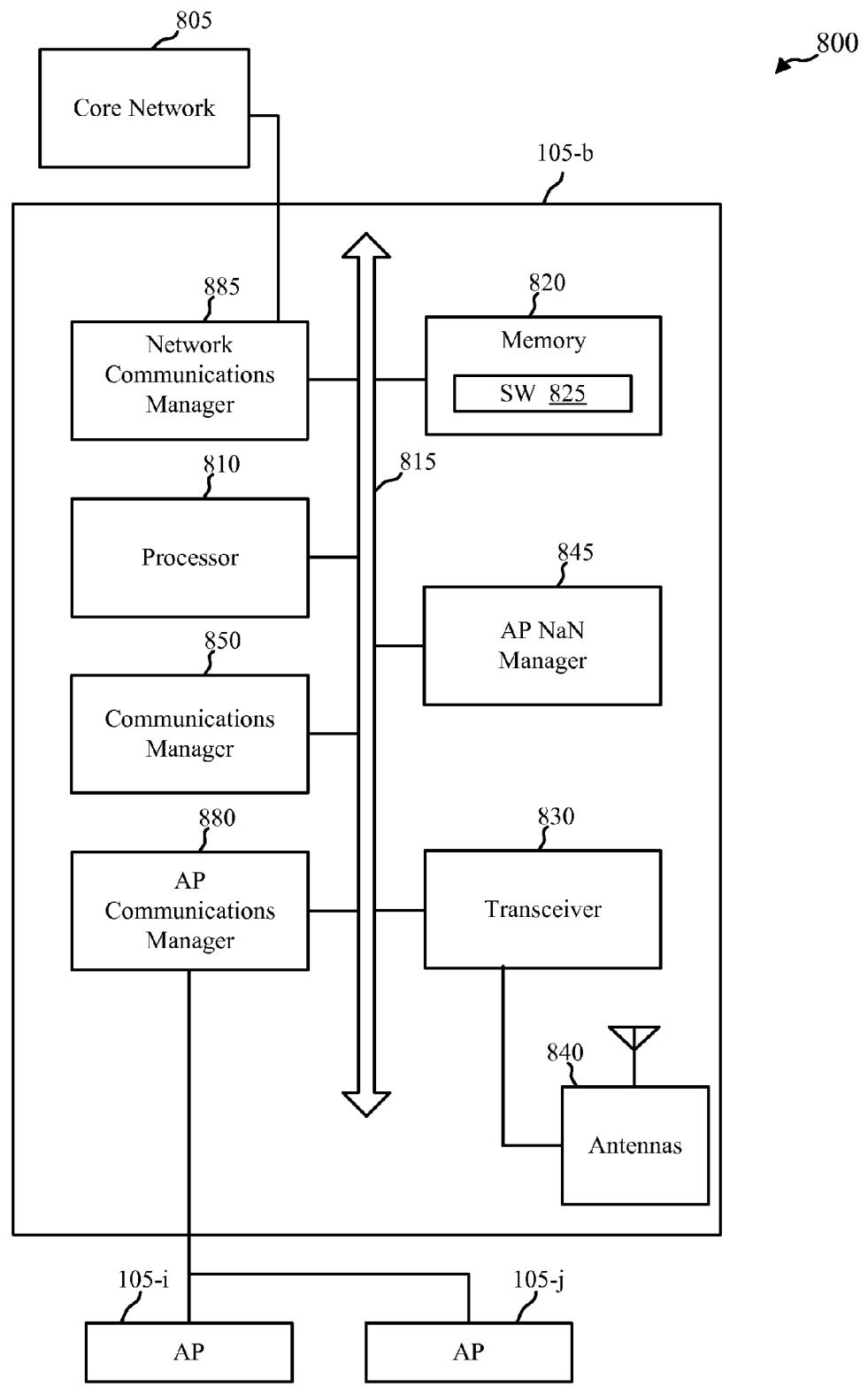
FIG. 8 shows a block diagram that illustrates an example of access point architecture according to various examples.

Turning to FIG. 8, a diagram 800 is shown that illustrates an access point or AP 105-*b* configured for NaN probe and NaN discovery response communication according to various examples. The AP 105-*b* may be an example of the APs 105 of FIG. 1 or 2A. The AP 105-*b* may include a processor 810, a memory 820, a transceiver 830, antennas 840, and a AP NaN manager 845. The AP NaN manager 845 may be an example of the NaN connection manager 520 or 520-*b* of FIG. 5A or 5C. The AP 105-*b* may also include one or both of an AP communications manager 880 and a network communications manager 885. Each of these components may be in communication with each other, directly or indirectly, over one or more buses 815.

These components of the AP 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The memory 820 may include random access memory (RAM) and read-only memory (ROM). The memory 820 may also store computer-readable, computer-executable software (SW) code 825 containing instructions that are configured to, when executed, cause the processor 810 to perform various functions described herein for NaN probe and discovery response communication. Alternatively, the software code 825 may not be directly executable by the processor 810 but be configured to cause the computer, e.g., when compiled and executed, to perform functions described herein.

The processor 810 may include an intelligent hardware device, e.g., a central processing unit (CPU), a microcontroller, an application-specific integrated circuit (ASIC), etc. The processor 810 may process information received through the transceiver 830, the AP communications manager 880, or the network communications manager 885. The processor 810 may also process information to be sent to the transceiver 830 for transmission through the antennas 840, to the AP communications manager 880, or to the network communications manager 885. The processor 810 may handle, alone or in connection with AP NaN manager 845, various aspects related to probe request and NaN discovery response communication as discussed above.

The transceiver 830 may include a modem configured to modulate packets and provide the modulated packets to the antennas 840 for transmission, and to demodulate packets received from the antennas 840. The transceiver 830 may be implemented as one or more transmitters and one or more separate receivers. The transceiver 830 may be configured to communicate bi-directionally, via the antennas 840, with one or more stations 115 as illustrated in FIG. 1, 2A, 2B, 6, or 7, for example. The AP 105-*b* may typically include multiple antennas 840 (e.g., an antenna array). The AP 105-*b* may communicate with a core network 805 through the network communications manager 885. The AP 105-*b* may communicate with other APs, such as the AP 105-*i* and the AP 105-*j*, using an AP communications manager 880.

According to the architecture of FIG. 8, the AP 105-*b* may further include a communications manager 850. The communications manager 850 may manage communications with stations or other devices as illustrated in the systems 100 or 200 of FIG. 1, 2A, or 2B, for example. The communications manager 850 may be in communication with some or all of the other components of the AP 105-*b* via the bus or buses 815. Alternatively, functionality of the communications manager 850 may be implemented as a component of the transceiver 830, as a computer program product, or as one or more controller elements of the processor 810.

The components of the AP 105-*b* may be configured to implement aspects discussed herein with respect to FIG. 1-5, or 10, and those aspects may not be repeated here for the sake of brevity.

Figure 9:
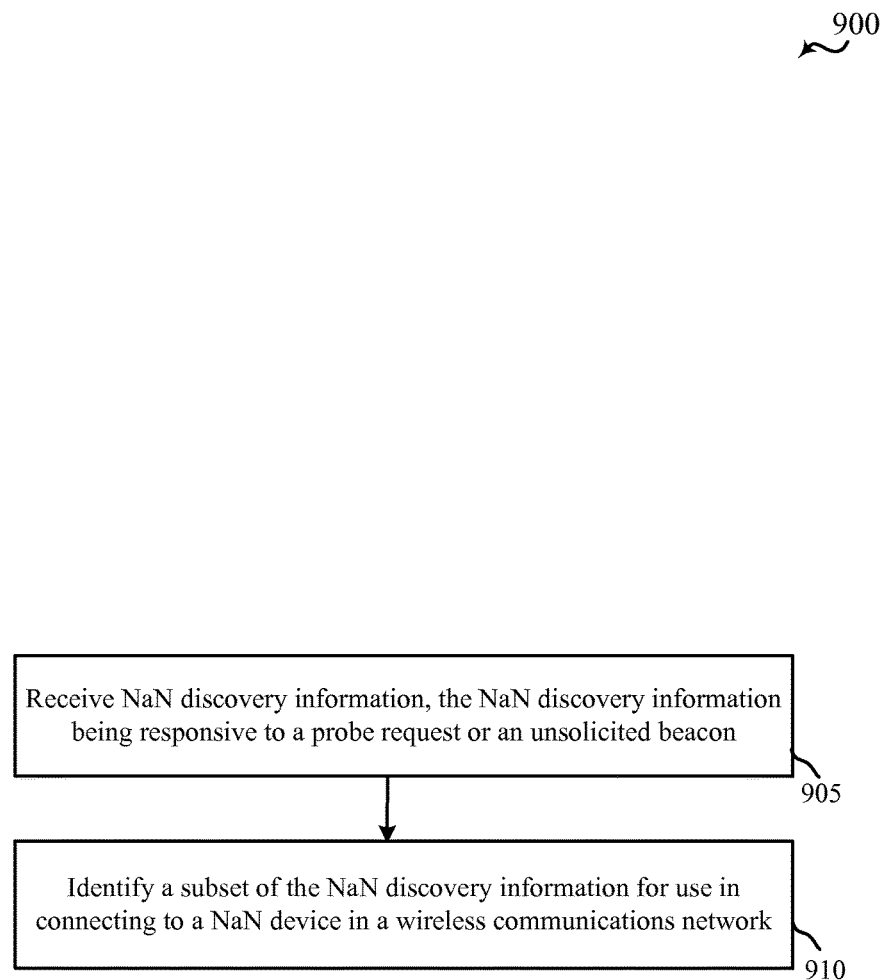
FIGS. 9, 10, 11, and 12 are flowcharts of examples of methods for NaN probe request transmissions and responses according to various examples.

FIG. 9 is a flowchart illustrating an example of a method 900 for wireless communications. For clarity, the method 900 is described below with reference to one of the stations or devices 115 or 505 shown in FIG. 1, 2A, 2B, 5A, 5B, 6, or 7. In one example, one of the stations may execute one or more sets of codes to control the functional elements of the station to perform the functions described below.

At block 905, the device receives NaN discovery information. In some embodiments, the NaN discovery information may be received in an unsolicited beacon signal, a probe response, or a discovery response public action frame, responsive to a probe request transmitted from a device. The probe request may be transmitted as part of an active scan for wireless network infrastructure other than NaN devices. The wireless network infrastructure other than NaN devices may include at least one of the group consisting of: a peer-to-peer (P2P) device, a soft-Access Point device, an independent basic service set (IBSS) device, a mesh device, and a station (STA) device. When the probe request is sent by one of these devices, the device sending the probe request may be collocated with one or more NaN devices, and the probe request may include NAN discovery information. These operations may be performed, for example, by one or more of the receivers 510 of FIG. 5A or 5B in conjunction with one or more other elements of the devices 505 or 505-*a*, or transceiver 640 and antennas 650 of FIG. 6 in conjunction with one or more other elements of station 115-*f*.

At block 910, a subset of the NaN discovery information is identified for use in connecting to a NaN device in a wireless communications network. These operations may be performed, for example, by one or more of the NaN connection managers 520 or 520-*a* of FIG. 5A or 5B in conjunction with other elements of the devices 505 or 505-*a*, or station NaN connection manager 660 of FIG. 6 in conjunction with one or more other elements of station 115-f.

Figure 10:
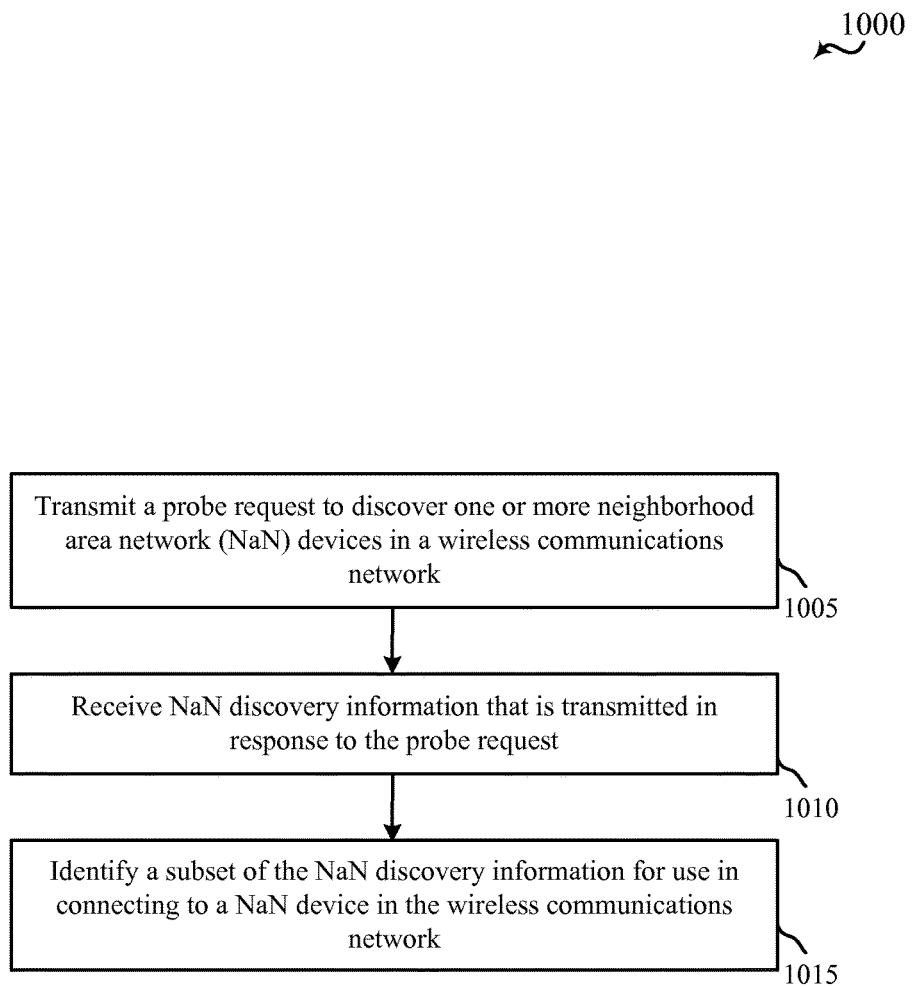

FIG. 10 is a flowchart illustrating another example of a method 1000 for wireless communications. For clarity, the method 1000 is described below with reference to one of the stations or devices 115 or 505 shown in FIG. 1, 2A, 2B, 5A, 5B, 6, or 7. In one example, one of the stations may execute one or more sets of codes to control the functional elements of the station to perform the functions described below.

At block 1005, the device may transmit a probe request to discover one or more neighborhood area network (NaN) devices in a wireless communications network. The probe request may be transmitted as part of an active scan for wireless network infrastructure other than NaN devices. The wireless network infrastructure other than NaN devices may include at least one of the group consisting of: a P2P device, a soft-Access Point device, an IBSS device, a mesh device, and a STA device. When the probe request is sent by one of the devices, the device sending the probe request may be collocated with the one or more NaN devices, and the probe request may include NAN discovery information. Transmission of the probe request may be performed, for example, by one or more of the transmitters 530 of FIG. 5A or 5B in conjunction with one or more other elements of the devices 505 or 505-a, or transceiver 640 and antennas 650 of FIG. 6 in conjunction with one or more other elements of station 115-f.

At block 1010, the device receives the NaN discovery information that is transmitted in response to receiving the probe request. These operations may be performed, for example, by one or more of the receivers 510 of FIG. 5A or 5B in conjunction with one or more other elements of the devices 505 or 505-a, or transceiver 640 and antennas 650 of FIG. 6 in conjunction with one or more other elements of station 115-f.

At block 1015, a subset of the NaN discovery information is identified for use in connecting to a NaN device in the wireless communications network. These operations may be performed, for example, by one or more of the NaN connection managers 520 or 520-a of FIG. 5A or 5B in conjunction with other elements of the devices 505 or 505-a, or station NaN connection manager 660 of FIG. 6 in conjunction with one or more other elements of station 115-f.

Figure 11:
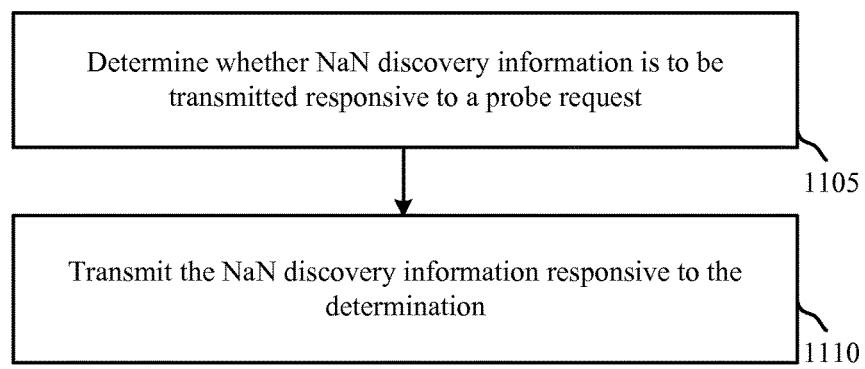

FIG. 11 is a flowchart illustrating an example of a method 1100 for wireless communications. For clarity, the method 1100 is described below with reference to one of the APs, stations or devices 105, 115, or 505 shown in FIG. 1, 2A, 2B, 5A, 5C, 7, or 8. In one example, one of the APs or stations may execute one or more sets of codes to control the functional elements of the AP or station to perform the functions described below.

At block 1105, it is determined whether NaN discovery information is to be transmitted responsive to a probe request. The probe request may be transmitted as part of an active scan for wireless network infrastructure other than NaN devices. The wireless network infrastructure other than NaN devices may include at least one of the group consisting of: a P2P device, a soft-Access Point device, an IBSS device, a mesh device, and a STA device. When the probe request is sent by one of the devices, the device sending the probe request may be collocated with one or more NaN devices, and the probe request may include NAN discovery information. These operations may be performed, for example, by one or more of the NaN connection managers 520 or 520-b of FIG. 5A or 5C in conjunction with other elements of the devices 505 or 505-b, master NaN connection manager 760 of FIG. 7 in conjunction with one or more other elements of station 115-g, or AP NaN manager 845 of FIG. 8 in conjunction with one or more other elements of AP 105-b.

At block 1110, the NaN discovery information may be transmitted responsive to the determination. The NaN discovery information may be transmitted in a probe response, beacon signal, or a discovery response public action frame. Such operations may be performed, for example, by one or more of the transmitters 530 of FIG. 5A or 5C in conjunction with one or more other elements of the devices 505 or 505-b, transceiver 740 and antennas 750 of FIG. 7 in conjunction with one or more other elements of station 115-g, or transceiver 830 and antennas 840 of FIG. 8 in conjunction with one or more other elements of AP 105-b.

Figure 12:
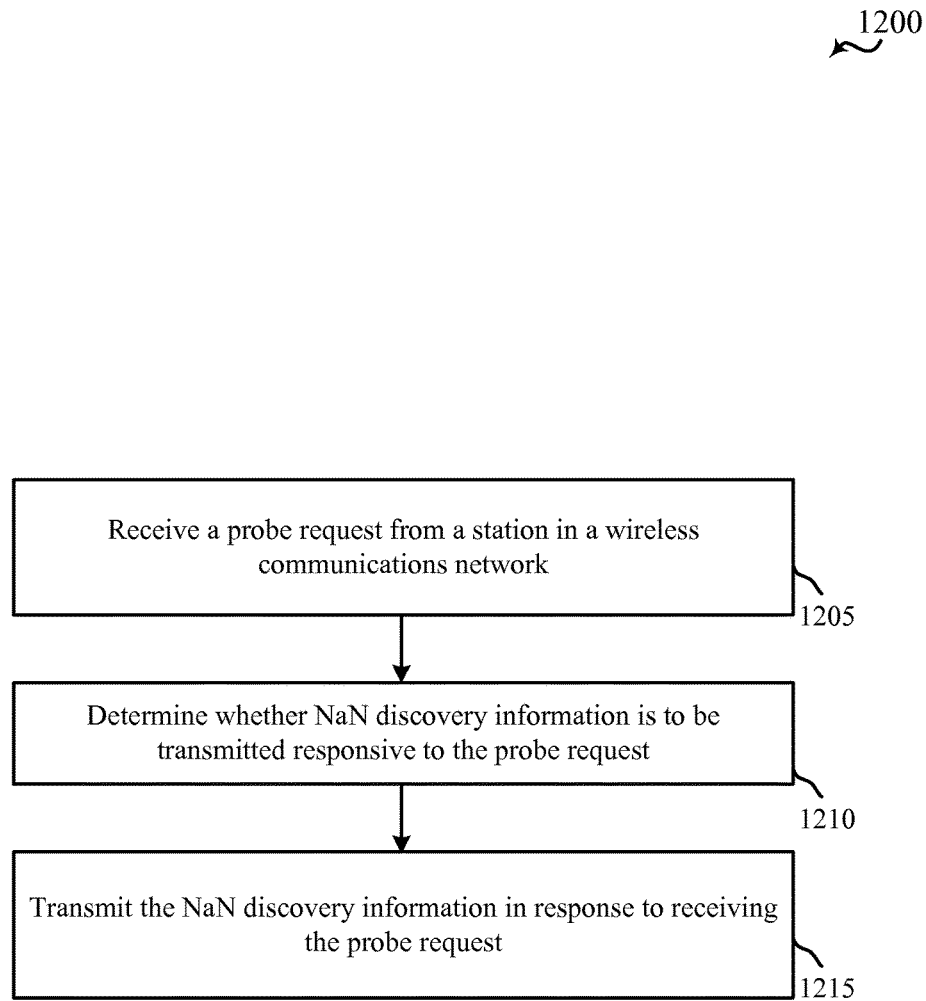

FIG. 12 is a flowchart illustrating an example of a method 1200 for wireless communications. For clarity, the method 1100 is described below with reference to one of the APs, stations or devices 105, 115, or 505 shown in FIG. 1, 2A, 2B, 5A, 5C, 7, or 8. In one example, one of the APs or stations may execute one or more sets of codes to control the functional elements of the AP or station to perform the functions described below.

At block 1205, a probe request may be received from a station in a wireless communications network. The probe request may be transmitted as part of an active scan for wireless network infrastructure other than NaN devices. The wireless network infrastructure other than NaN devices may include at least one of the group consisting of: a P2P device, a soft-Access Point device, an IBSS device, a mesh device, and a STA device. When the probe request is sent by one of the devices, the device sending the probe request may be collocated with one or more NaN devices, and the probe request may include NAN discovery information. Reception of the probe request may be performed, for example, by one or more of the receivers 510 of FIG. 5A or 5C in conjunction with one or more other elements of the devices 505 or 505-b, transceiver 740 and antennas 750 of FIG. 7 in conjunction with one or more other elements of station 115-g, or transceiver 830 and antennas 840 of FIG. 8 in conjunction with one or more other elements of AP 105-b.

At block 1210, it is determined whether a NaN discovery information is to be transmitted responsive to the probe request. These operations may be performed, for example, by one or more of the NaN connection managers 520 or 520-b of FIG. 5A or 5C in conjunction with other elements of the devices 505 or 505-b, master NaN connection manager 760 of FIG. 7 in conjunction with one or more other elements of station 115-g, or AP NaN manager 845 of FIG. 8 in conjunction with one or more other elements of AP 105-b.

At block 1215, the NaN discovery information may be transmitted in response to receiving the probe request. The NaN discovery information may be transmitted in at least one of the group consisting of: a probe response, a beacon signal, and a discovery response pubic action frame. These operations may be performed, for example, by one or more of the transmitters 530 of FIG. 5A or 5C in conjunction with one or more other elements of the devices 505 or 505-b, transceiver 740 and antennas 750 of FIG. 7 in conjunction with one or more other elements of station 115-g, or transceiver 830 and antennas 840 of FIG. 8 in conjunction with one or more other elements of AP 105-b.

Thus, the methods 900, 1000, 1100, and 1200 may provide for wireless communications. It should be noted that each of the methods 900, 1000, 1100, and 1200 is just one implementation and that the operations of the methods 900, 1000, 1100, and 1200 may be rearranged or otherwise modified such that other implementations are possible. In some instances, the operations of the methods 900, 1000, 1100, and 1200 may be combined to produce other implementations.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   transmitting, by a first device, a probe request associated with a first discovery procedure of a wireless network, the probe request comprising a neighborhood area network (NaN) information element corresponding to a second discovery procedure that is different from the first discovery procedure and further corresponding to a NaN cluster of devices and services, wherein the NaN cluster of devices and services is associated with the second discovery procedure that is different from the first discovery procedure;
   receiving, by the first device, NaN discovery information, wherein the NaN discovery information comprises NaN cluster information and is received in response to a the probe request; and
   identifying a subset of the NaN discovery information for use in connecting to a second device in the NaN cluster of devices and services.

2. The method of claim 1, further comprising:
   transmitting the probe request, wherein receiving the NaN discovery information is in response to receiving the probe request.

3. The method of claim 1, wherein receiving the NaN discovery information comprises receiving the NaN discovery information in at least one message from the group consisting of:
   a probe response, a beacon signal, and a discovery response public action frame.

4. The method of claim 1, wherein the NaN discovery information further comprises a number of information elements indicating details about the second device for establishing a wireless connection with the second device.

5. The method of claim 1, wherein the subset of the NaN discovery information comprises at least one parameter from the group consisting of:
 a synchronization beacon timing, a discovery timing, and an identity of the second device.

6. The method of claim 1, wherein the probe request is transmitted as part of an active scan for wireless network infrastructure other than NaN devices.

7. The method of claim 6, wherein the wireless network infrastructure other than NaN devices comprises at least one device from the group consisting of:
 a peer-to-peer (P2P) device, a soft-Access Point device, an independent basic service set (IBSS) device, a mesh device, and a station (STA) device.

8. The method of claim 1, wherein the first device is from the group consisting of:
 a P2P device, a soft-Access Point device, an IBSS device, a mesh device, and a STA device; and wherein the first device is collocated with the second device.

9. The method of claim 1, wherein receiving the NaN discovery information comprises receiving the NaN discovery information from at least one device from the group consisting of:
 the second device and a third device of the wireless communications network.

10. A first device for wireless communications, comprising:
 a transmitter to transmit a probe request associated with a first discovery procedure of a wireless network, the probe request comprising a neighborhood area network (NaN) information element corresponding to a second discovery procedure that is different from the first discovery procedure and further corresponding to a NaN cluster of devices and services, wherein the NaN cluster of devices and services is associated with the second discovery procedure that is different from the first discovery procedure;
 a receiver to receive NaN discovery information, wherein the NaN discovery information comprises NaN cluster information and is received in response to the probe request; and
 a processor to identify a subset of the NaN discovery information for use in connecting to a second device in the NaN cluster of devices and services.

11. The first device of claim 10, further comprising:
 a transmitter to transmit the a probe request, wherein the receiver receives the NaN discovery information in response to receiving the probe request.

12. The first device of claim 10, wherein receiving the NaN discovery information comprises receiving the NaN discovery information in at least one message from the group consisting of:
 a probe response, a beacon signal, and a discovery response public action frame.

13. The first device of claim 10, wherein the NaN discovery information further comprises a number of information elements including details about the second device for establishing a wireless connection between the first device and the second device.

14. The first device of claim 10, wherein the probe request is transmitted as part of an active scan for wireless network infrastructure other than NaN devices.

15. A method for wireless communications, comprising:
 receiving a probe request from a first device at a second device, wherein the probe request is associated with a first discovery procedure of a wireless network, the probe request comprising a neighborhood area network (NaN) information element corresponding to a second discovery procedure that is different from the first discovery procedure and further corresponding to a NaN cluster of devices and services, wherein the NaN cluster of devices and services is associated with the second discovery procedure that is different from the first discovery procedure;
 determining whether NaN discovery information is to be transmitted responsive to the a probe request, wherein the NaN discovery information comprises NaN cluster information; and
 transmitting the NaN discovery information responsive to the determination.

16. The method of claim 15, wherein transmitting the NaN discovery information is in response to receiving the probe request.

17. The method of claim 15, wherein determining whether the NaN discovery information is to be transmitted comprises:
 determining when a next scheduled transmission of a beacon signal comprising NaN discovery information is to occur; and
 determining that the NaN discovery information is to be transmitted when a time until the next scheduled transmission exceeds a threshold time period.

18. The method of claim 15, wherein determining whether the NaN discovery information is to be transmitted comprises:
 determining an elapsed time since NaN discovery information has been transmitted; and
 determining that the NaN discovery information is to be transmitted when the elapsed time exceeds a threshold elapsed time period.

19. The method of claim 15, wherein the NaN discovery information is transmitted in at least one message from the group consisting of; a probe response, a beacon signal, and a discovery response public action frame.

20. The method of claim 15, wherein the NaN discovery information further comprises a number of information elements indicating details about the second device for establishing a wireless connection.

21. The method of claim 15, wherein determining whether the NaN discovery information is to be transmitted comprises:
 determining that transmitting the NaN discovery information is to be skipped when another NaN device has transmitted NaN discovery information responsive to the probe request.

22. A second device for wireless communications, comprising:
 a receiver to receive a probe request from a first device, wherein the probe request is associated with a first discovery procedure of a wireless network, the probe request comprising a neighborhood area network (NaN) information element corresponding to a second discovery procedure that is different from the first discovery procedure and further corresponding to a NaN cluster of devices and services, wherein the NaN cluster of devices and services is associated with the second discovery procedure that is different from the first discovery procedure;
 a processor to determine whether NaN discovery information is to be transmitted responsive to the a probe request, wherein the NaN discovery information comprises NaN cluster information; and
 a transmitter to transmit the NaN discovery information responsive to the determination.

23. The second device of claim 22,
wherein the transmitter transmits the NaN discovery information in response to receiving the probe request.

24. The second device of claim 22, wherein the processor is further to:
determine when a next scheduled transmission of a beacon signal comprising NaN discovery information is to occur; and
determine that the NaN discovery information is to be transmitted when a time until the next scheduled transmission exceeds a threshold time period.

25. The second device of claim 22, wherein the processor is further to:
determine an elapsed time since NaN discovery information has been transmitted; and
determine that the NaN discovery information is to be transmitted when the elapsed time exceeds a threshold elapsed time period.

26. The second device of claim 22, wherein the NaN discovery information further comprises NaN device information.

* * * * *